United States Patent [19]

Bechtel

[11] Patent Number: 4,806,932
[45] Date of Patent: Feb. 21, 1989

[54] RADAR-OPTICAL TRANSPONDING SYSTEM

[75] Inventor: Bartow Bechtel, Richardson, Tex.

[73] Assignee: Entropy, Inc., San Antonio, Tex.

[21] Appl. No.: 838,468

[22] Filed: Mar. 11, 1986

[51] Int. Cl.⁴ .............................................. G01S 13/80
[52] U.S. Cl. ......................................... 342/33; 342/6; 342/10; 342/35
[58] Field of Search ................... 342/33, 34, 35, 6, 46, 342/10

[56] References Cited

U.S. PATENT DOCUMENTS

| | | | |
|---|---|---|---|
| 2,580,291 | 1/1952 | Iams | 342/6 |
| 2,850,728 | 9/1958 | Wright et al. | 342/6 |
| 3,154,784 | 10/1964 | Allen | 342/6 |
| 3,158,862 | 11/1964 | Chisholm | 343/18 D |
| 3,243,816 | 3/1966 | Chisholm | 343/18 D |
| 3,295,132 | 12/1966 | Chapman, Jr. | 343/18 D |
| 3,648,285 | 3/1972 | Sanders | 342/33 |
| 3,703,723 | 11/1972 | Albanese et al. | 343/18 D |
| 3,908,189 | 9/1975 | Buehler et al. | 343/18 DX |
| 4,065,771 | 12/1977 | Gulick et al. | 342/368 |
| 4,104,634 | 8/1978 | Gillard et al. | 343/18 C |
| 4,143,263 | 3/1979 | Eichweber | 342/6 X |
| 4,283,725 | 8/1981 | Chisholm | 343/5 W |

Primary Examiner—Thomas H. Tarcza
Assistant Examiner—John B. Sotomayor
Attorney, Agent, or Firm—Hubbard, Thurman, Turner & Tucker

[57] ABSTRACT

An airport landing system includes an airborne transmitter and receiver for transmitting RF energy at a first frequency and receiving RF energy at a second frequency. A stationary RF energy focusing means for focusing received RF energy. At least four receive/transmit modules and at least one RF source module. The RF source module for amplitude modulating and amplifying the received RF energy for retransmission by the receive/transmit modules. The receive/transmit modules having RF energy collector horns physically arranged with at least two vertically disposed horns and two horizontally disposed horns for transmitting at least four relatively high gain powered beams whose patterns cross over at their half power points with the crossover point defining the approach path.

18 Claims, 7 Drawing Sheets

FOUR BEAM (L, R & U, D) APPROACH PATH USING COMMON RF SOURCE AND PERFORMANCE MONITORING

RADAR-OPTICAL TRANSPORTING SYSTEM

$f_1$ = AUDIO MODULATION FREQUENCY "1"
$f_2$ = AUDIO MODULATION FREQUENCY "2"

FIG. 3A
(PRIOR ART)

$f_3$ = AUDIO MODULATION FREQUENCY "3"
$f_4$ = AUDIO MODULATION FREQUENCY "4"

FIG. 9A
FOUR BEAM (L, R & U, D) APPROACH PATH USING

RADAR-OPTICAL TRANSPONDING SYSTEM

BACKGROUND OF THE INVENTION

This invention relates to airport landing and takeoff systems and more particularly to a radar-optical transponding system suitable for use at airports and heliports.

In the prior art the instrument landing system (ILS) has been extensively used for landing aircraft at airports during low ceilings and low visibility weather conditions. ILS operates at very high frequencies (VHF) and ultra high frequencies (UHF). At these wavelengths antenna patterns are very broad and course stability is vulnerable to ground moisture content and spurious reflections from hangers or rising terrain near the approach paths. Further, the ILS localizer (azimuth determining beams) and glide slope (descent path) antenna systems may require special tailoring for use at most airports to avoid interference patterns and achieve acceptable course accuracy and stability. Not infrequently expensive grading is required for ILS site preparation. In addition to the airport ILS localizer and glide path antenna systems and equipment installations, the system requires three VHF ground marker beacons some distance (up to five miles) from the airport runway threshold.

A landing system employing microwave frequencies can be designed to have highly directional and narrow beams which can essentially eliminate spurious reflections from terrain or buildings, multipath, and sensitivity to ground moisture content etc. MLS because of its size and expense will be available only to major airports.

Additional information which can be supplied by a landing system (not the present ILS) is wind shear information, ground speed, range to runway, and distance to end of runway. The Federal Aviation Administration has determined that a comparison of ground speed to air speed during landing and takeoff is a way to detect (sense) and avoid wind shear. One accurate way to determine ground speed is to equip each airplane with an inertia navigation system; however, for many aircraft the expense involved for this approach is prohibitive. Another way which employed an airborne weather radar to range track a modulating reflector on the ground, has been tried. The problem with the radar/reflector approach lies in obtaining sufficiently high signal to ground clutter ratio, initial target (reflector) acquisition by the radar, and the modifications to the aircrafts weather radar to give it a range angle/track capability.

However, a modulating reflector (Luneberg lens), was developed and patented (U.S. Pat. No. 3,295,137, issued Dec. 23, 1966) in an attempt to provide such a target. The Luneberg lens was equipped as a passive, non-radiating, modulating radar reflector which produces a known amplitude modulated (AM) frequency which can be identified and tracked by the airborne radar. All other targets are ignored as long as the signal to clutter ratio is reasonable.

A problem with the Luneberg lens type modulating reflector, which will be described in pertinent part, hereinafter, is that it had to be mechanically spun. The reliability of mechanical spinning devices is subject to the environmental conditions. Further, no ideal material exists for construction of the lens. A foam plastic material was used, but the material severely limited its maximum modulation frequency, because for a 30" diameter Luneberg lens, the lens self destructed at about 600 revolutions per minute (RPM) and under 600 RPM the centrifugal force distorted the lens. Also, a problem associated with the Luneberg lens is achieving a lens radar cross section large enough to stand out above the local ground clutter present in a radar return signal Particularly, where it is desired to use the reflector on an offshore oil rig, ship, or other heliport locations.

Another problem with the airborne radar and ground reflector system lies in the high power radar transmitter (5 kw to 50 kw) required to provide an effective range of from 10 to 25 miles. To provide such power, microwave vacuum tube devices such as magnetrons, are generally used and the reliability of the modified magnetron type radar system is considered inadequate for a landing system. The addition of a redundant transmitter to improve system reliability is objectionable not only because of cost but also because of the additional power, space required, and the added weight.

SUMMARY OF THE INVENTION

Accordingly, it is an object of the present invention to provide an airborne interrogator/ground transponder type system where the interrogator's transmitter has a peak power of one to five watts which can be obtained using state-of-the art gallium arsenide transistors.

Another object of the invention is to provide a ground transponder having the capability of transmitting modulated energy from a low power solid state microwave transmitter at the same frequency which stimulates it, or at a different frequency in order to avoid background clutter at the interrogator.

Still another object of the invention is to provide an airborne interrogator and a ground based transponder which receives and transmits modulated electromagnetic energy back along substantially the same path of the received energy.

Yet, another object of the invention is to provide an airborne interrogator for interrogating a ground transponder for a return containing navigational type information and having an interpreter for gleaning the information therefrom.

A further object of the invention is to provide a ground based transponder suitable for use at such small places as heliports, oil rigs or ships and the like.

Still a further object of the invention is to provide both an airborne interrogator and a ground transponder for a microwave landing system which are small in size and weight, highly reliable, and low cost.

Yet, still a further object of the invention is to provide a microwave landing system having high resolution microwave beams.

It is also an object of the invention to provide a stationary Luneberg lens system to focus incoming substantially plane wave energy to a small spot on its surface opposite that through which the plane wave entered and to transmit modulated energy back through the lens for forming a tightly collimated return beam to the interrogator receiver site.

It is also a further object of the invention to provide a landing system having a ground unit located at one side of a runway for supplying glide slope guidance and accurate range information, and another ground unit located on an extended center line of the runway opposite that of the touch down point for supplying localizer and rollout guidance information to incoming aircraft.

It is also another object of the invention to provide a landing system having a hyperbolic (flared) glide slope guidance path.

Briefly stated the invention comprises an airborne transmitter for transmitting a interrogating beam and a stationary transponder having a plurality of selectively spaced focusing means and a plurality of audio frequency amplitude modulated pulse forming modules selectively positioned for one of the modules to receive the focused energy of the incoming interrogating beam, whereby the received pulse train energy is amplified, amplitude modulated at audio frequencies and retransmitted back along the received path to the airborne interrogator.

BRIEF DESCRIPTION OF THE DRAWINGS

The invention consists in the foregoing and also envisages constructions of which the following gives examples only with reference to the accompanying drawings in which:

FIG. 9b is a front view of the four horn arrangement for the embodiment of FIG. 9a;

DESCRIPTION OF THE PREFERRED EMBODIMENT

Figure 1:
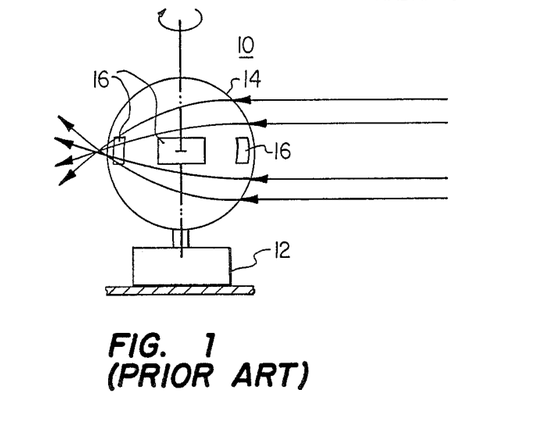
FIG. 1 is a view of a prior art Luneberg lens.
Figure 1A:
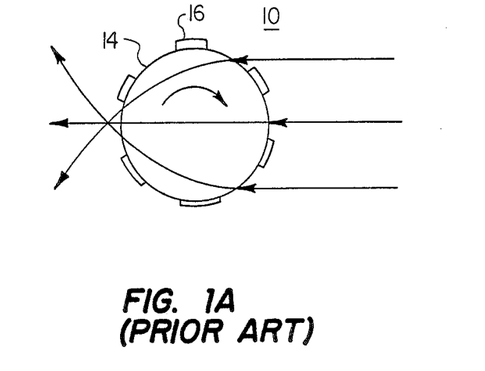
FIGS. 1a and 1b are top views of the Luneberg lens operating, respectively, as a gather and reflector of electromagnetic energy.
Figure 1B:
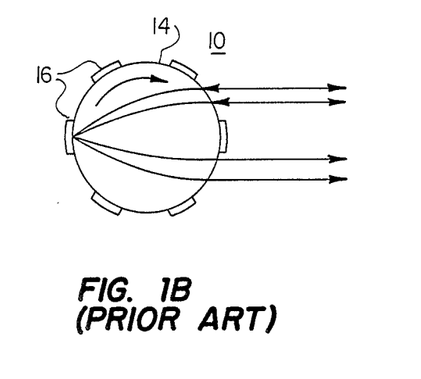
Figure 2A:
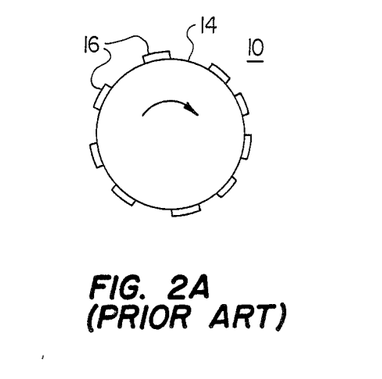
FIGS. 2a and 2b are, respectively, top and side views of a Luneberg lens operating as a radar coded reflector.
Figure 2B:
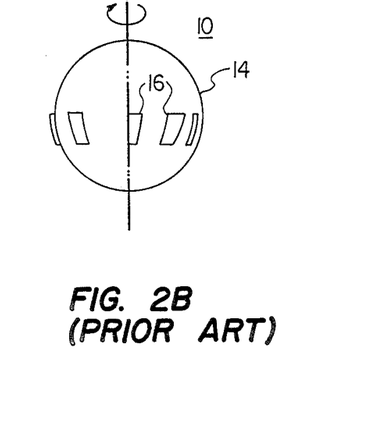
Figure 2C:
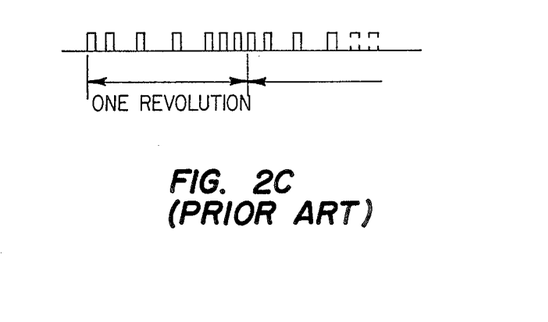
FIG. 2c is a chart of the coded audio output of the Luneberg reflector of FIGS. 2a and 2b, as may also be produced by the present invention.

Referring now to the prior art of FIG. 1, a Luneberg lens 10 is rotated by motor 12 at a constant rate of speed. The lens 10 focuses incoming radar energy to a small spot on the spherical surface 14 of the lens opposite the side where the radar waves entered. If no reflecting surface 16 is present where the spot is formed (FIG. 1a), the radar energy passes through the surface, is dissipated, and substantially none of the focused radar signal is returned to the radar transmitting vehicle. If a radar reflective element 16, which is, for example, a piece of aluminum foil, is present at the radar spot (FIG. 1b), the radar signal is reflected precisely back in a very sharp beam along the path from whence it came. The Luneberg lens 10 (FIG. 2a) which uses spaced patches 16 on the surface 14 is mechanically rotated to chop or amplitude modulate the incoming radar signals in order that the reflected radar energy is at an audio frequency (FIG. 2c). At a fixed rotational speed, the audio frequency is proportional to the number of reflective patches (9 used) (FIGS. 2a and 2b). The Luneberg lens 10 as shown in FIG. 2b has its patches 14 spaced to produce a digitally coded word (FIG. 2c) which permits positive identification of the facility at which it is located. For example, with a 15 inch radius lens, several thousand individual codes are available for identification purposes.

Figure 3A:
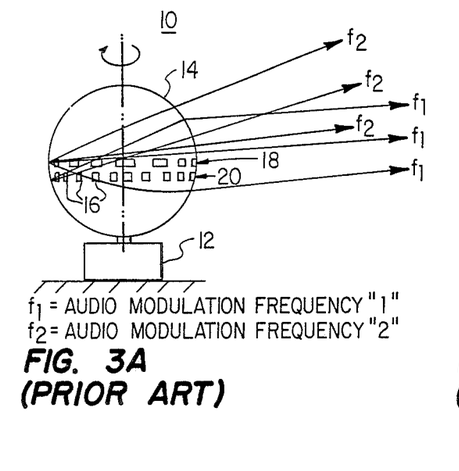
FIGS. 3a and 3b are views showing the use of the Luneberg lens used to establish a descent path and as a localizer.

Referring now to FIG. 3a, in which is shown the Luneberg lens 10 with two horizontal rows 18 and 20 of patches 16 for establishing a descent path. It will be noted that each row 16 and 18 has a different number of reflective patches for producing different audio frequencies at different elevation angles. It will be appreciated that the focused spot has a definite size depending on the frequency of the radar used. At X-band, the spot about 0.75 inches in diameter. Thus, if the vertical height of the reflective patches 16 is properly sized, as the spot moves, when the elevation angle of the incoming energy is changed, there is a smooth transition of the percentage of IF of the two audio frequencies, $f_1$ and $f_2$ in the return signals. This mixing action is such that with the 15 inch radius lens, a precision of about 0.1 degrees of elevation angle is attainable.

In a Luneberg lens 10 in FIG. 3a, the modulating frequencies in space establish a conical (360°) descent path pattern.

Figure 3B:
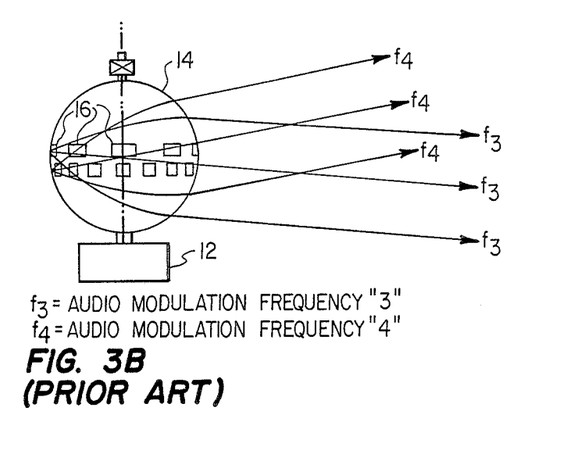

Referring now to FIG. 3b, if another Luneberg lens 10 is mounted for rotation with its spin axes horizontal and uses an arrangement of reflective patches 16 different from those used on the elevation lens, a localizer (azimuth) pattern is produced.

To alleviate the problems in rotating a purely reflective lens used in the prior art, various configurations of transponding (receive/transmit, or beacon) modules are used.

Figure 4:
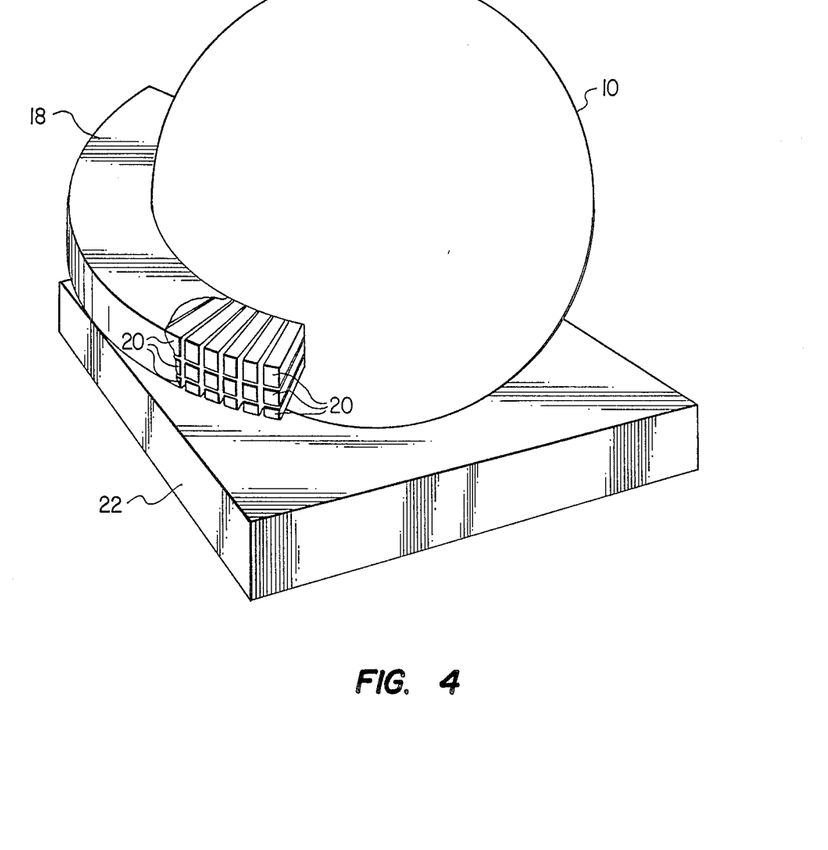
FIG. 4 is a conceptual sketch of an array of transponder modules with a focusing means in accordance with the present invention.

Referring now to FIG. 4, the transponder system comprises a stationary spherical Luneberg lens 10 and an array 18 of audio frequency amplitude modulated pulse forming modules 20. A platform 22 supports the Luneberg lens.

Figure 5:
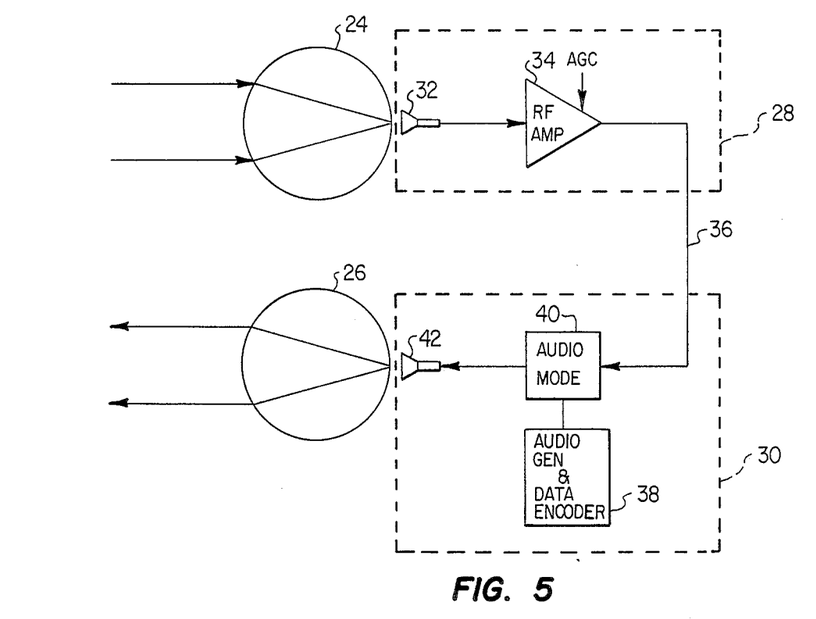
FIG. 5 shows an implementation of the transponder of the present disclosure in which two focusing means and a separate receive and re-transmit module is used.

A first lens module embodiment is shown in FIG. 5. In this embodiment, two focusing lens means 24 and 26 are used. The lens 24 is used to receive the RF energy of the transmitter of an airborne radar transmitter/receiver, hereinafter described, for focusing on a receive module 28 and the lens 26 is used to transmit the return (amplified RF energy) of a transmit module 30 back along the receiving path to the radar receiver.

The receive module 28 includes an energy receptor such as a small waveguide horn 32. The horn collects the focused energy. A radio frequency amplifier 34 with automatic gain control (AGC) is connected to the horn 32. The amplifier 34 is preferably a state-of-the art solid state amplifier capable of amplifying the radar frequencies of interest. The amplified energy pulses are fed by an appropriate means such as co-axial cable or wave guide 36 to the adjacent transmit module 30. Here an audio frequency generator and data encoders 38 operate an audio modulator 40 to amplitude modulate the pulse train from module 28. A typical pulse repetition rate is, for example, between 50 Hz and 2000 Hz. The audio frequency amplitude modulated pulses of the audio modulator 40 are fed to an appropriate energy feed means such as a microwave horn 42 and are transmitted into the focusing means 26 to be retransmitted essentially along the same path from which they came. In this embodiment the return energy is at the same frequency as the received energy, and thus, does not necessarily eliminate background clutter.

A second embodiment (FIG. 6) is a two lens configuration that does provide effective clutter cancellation. The receive energy is focused by the lens 44 to the RF horn 46 of the receive module 47 for collection. A band pass filter 48 is connected to the horn to remove any spurious out of band signals before the energy is amplitude limited by a limiter 50 connected to the BPF. The limiter 50 is to prevent saturation of subsequent electronic elements (mixer 52 in particular in the presence of a very high power received signal. A conventional radar type mixer 52 is connected to the limiter 50 and local oscillator (LO) 54 which mixes or beats the received energy with the LO signal which is another RF signal with a fixed frequency offset. The mixer produces a sum and difference R-F signal, the difference frequency, commonly called the IF or intermediate frequency is filtered in band pass filter 54 and amplified in an IF frequency amplifier 56. Amplifier 56 is, for example, an integrated circuit amplifier. A detector 58 detects the IF signal for the transmit module 60 and produces what is commonly called the video pulse envelope of the receive signal.

Figure 6:
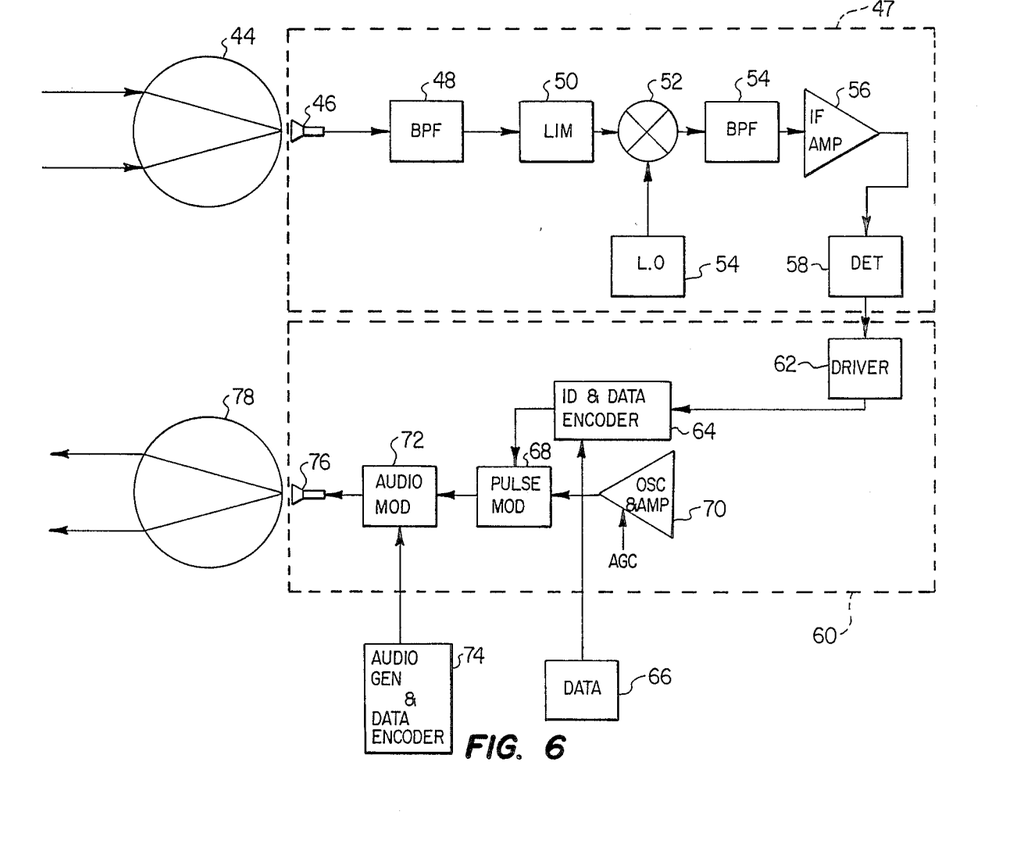
FIG. 6 shows another transponder implementation also using two focusing means.

The transmit module 60 includes a pulse driver 62 connected to the detector 58 for conditioning the detected signal for an identification (ID) and data encoder 64. The data encoder 64 is connected to a data source 66. The data encoder 64 inhibits selected driver pulses to provide a digitally encoded pulse train supplying, for example, ground unit ID and meteorological data.

A pulse modulator 68 is connected to the encoder 64 and to an oscillator amplifier 70 for pulse modulating another RF signal which was produced in the RF oscillator amplifier 70. In this embodiment the oscillator amplifier produces an RF signal whose frequency is discretely offset from the receive frequency. An audio modulator 72 is connected to the pulse modulator 68 and to an audio generator and data encoder 74. A horn 76 is connected to the audio modulator 72 for transmitting the modulated RF signal back through a lens 78 to the airborne radar receiver. The radar receiver being tuned to the frequency of the returning RF energy is not influenced by any ground clutter returning at the radar transmit frequency.

Figure 7:
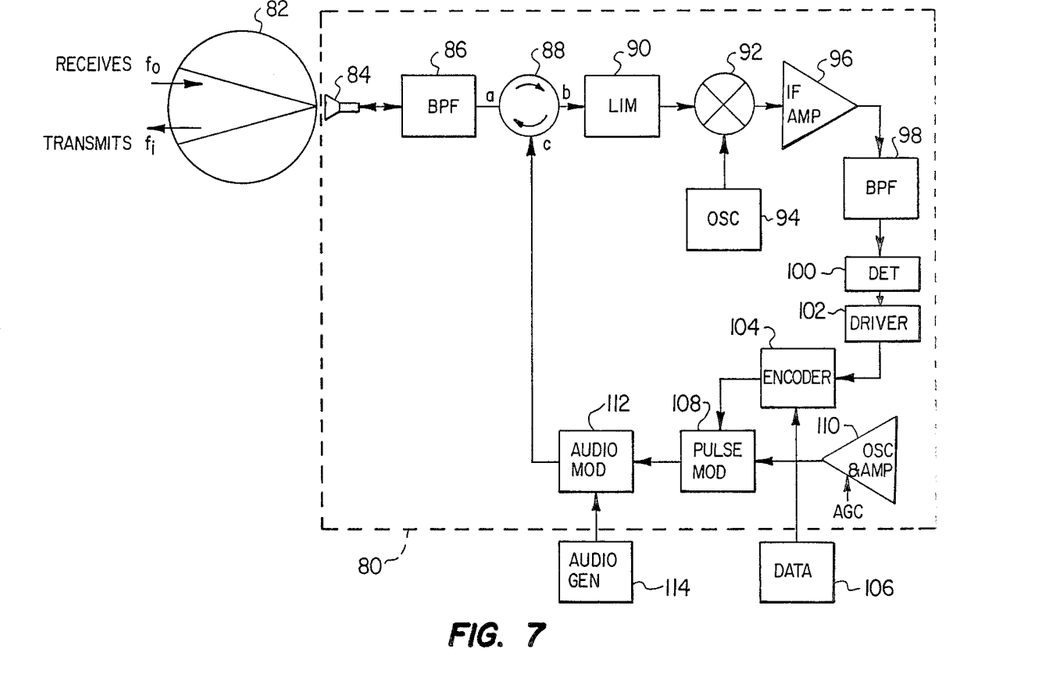
FIG. 7 shows still another implementation of a transponder using one focusing means.

Referring now to FIG. 7, a third embodiment is shown that requires only one focusing device for a receive/transmit audio frequency module 80. A lens 82 is used to focus the receive signal into the RF horn 84 which passes the RF signal into the bandpass fitter 86. An RF circulator 88 is connected to the BPF. The circulator 88 is a three RF port device that has the property that an RF signal introduced into one port, shown as port (a), will exit port (b), and substantially not through port (c). Also, very importantly, a signal introduced into port (c) will substantially exit through port (a) only, and not through port (b). This prevents a transmit signal, to be discussed hereinafter, which is to be radiated back through RF horn 84, from entering receive port (b). A limiter 90 is connected to port (b). The limiter 90 limits the maximum RF receive signal level. The RF mixer 92 is connected to the limiter 90 and LO 94 where again the signal is beat with a fixed reference signal for producing a fixed difference frequency, or intermediate frequency (IF). An IF amplifier 96 is connected to the mixer 92 for amplifying the IF signal. An IF bandpass filter 98, connected to the BPF, filters the IF signal for an amplitude detector 100. The detector 100 produces a video pulse. This video pulse is fed through a pulse driver 102 to a data encoder 104. Data encoder 104 is connected to a data source 106 for coder information.

The data encoder passes and inhibits the RF modulation pulse to produce a pulse coded data train code, time shared with the normal output signal, that transmits data such as, for example, the identification code of the particular ground facility, meteorological data, roll, pitch or heave of a vessel on which the ground station might be mounted. The recorded data is derived by an outside means not a part of this invention. After the pulse modulation has been encoded on a timeshared basis, the pulse is fed to a pulse modulator 108 connected to the encoder 104 and oscillator amplifier 110 for modulating the signal output of the RF oscillator and RF oscillator amplifier 110. This oscillator produces an RF frequency different from that originally received in order to cancel the effects of background clutter.

The pulse train is then passed through an audio modulator 112 connected to the pulse modulator 108. The audio modulator 112 is driven by an audio oscillator or tone generator 114 that imposes an audio frequency envelope on the pulse train. The third port (c) of the circulator 88 is connected to the audio amplifier for directing substantially all of the RF energy back through horn 84, where it is once again focused into a tight beam in space by lens 82 for the radar receiver. It perhaps should be noted here that the oscillator amplifier 110 could be made common to the plurality of these modules used in the system hereinafter described.

Figure 8:
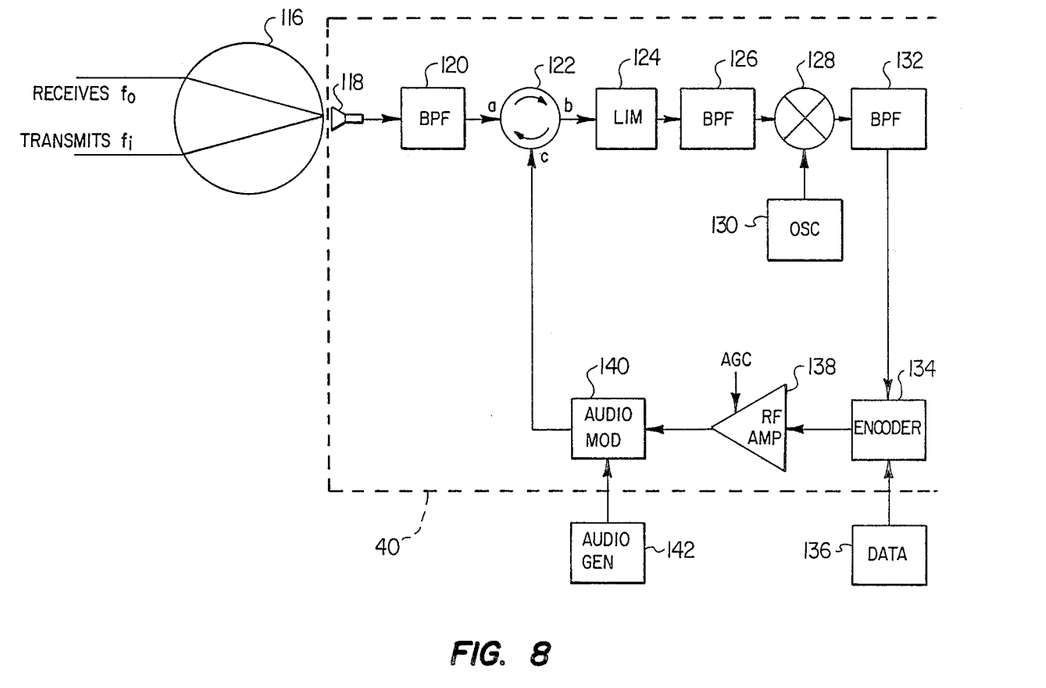
FIG. 8 shows another implementation of a transponder requiring only one focusing means.

The embodiment of FIG. 7 can be simplified as shown in the fourth embodiment of FIG. 8, wherein the receive pulse is focused by a lens 116 into the RF horn 118, and sent through the bandpass filter 120 into port (a) of the RF circulator 122. The receive RF signal is passed out of port (b) of the circulator 122 and into an amplitude limiter 124. A bandpass filter 126 is connected to port (b) of the circulator 122 for filtering the receive RF energy. An RF mixer 128 is connected to the BPF 126 and LO 130 for mixing.

In this embodiment the local oscillator (or off-set oscillator) has a frequency of the order of a few hundred Mega Hertz. This produces a sum or difference frequency that is still in the microwave spectrum. This RF signal is passed through a bandpass filter 132 to select either the sum or difference frequency as desired and reject the other spurious undesired frequencies generated in the mixing process. The selected frequency is passed through a data encoder 134, connected to the data source 136. Selected RF pulses are inhibited and the remainder are passed on to provide a pulse coded data chain as in the configuration of FIG. 7. After being encoded, the RF pulse string is applied to an RF amplifier 138 having AGC. The RF amplifier is, for example, composed of one or more high frequency gallium arsenide integrated circuit chips. The amplified RF pulses are sent through an audio modulator 140 where they are amplitude modulated at an audio frequency provided by the audio generator 142. From the audio modulator, the amplitude modulated pulse train is sent to port (c) of circulator 122, where it is directed to the RF horn 118, focused by lens 116, and radiated into space as a narrow radar beam.

The technique of comparing amplitudes of amplitude modulated signals has been used successfully for many years in the Instrument Landing System (ILS) to determine that an aircraft is on the correct approach course as signified by the reception of equal amplitude of the radio signals in the aircraft. One problem that can occur is that the relative amplitude of the transmitted signals may become unequal for a variety of reasons, skewing the apparent centerline of the radio beams. This problem can occur when using two or more of the modules described above. The use of a large amount of negative feedback around the RF amplifier, and sampling and using automatic gain control (AGC) vastly reduces this effect.

Figure 9A:
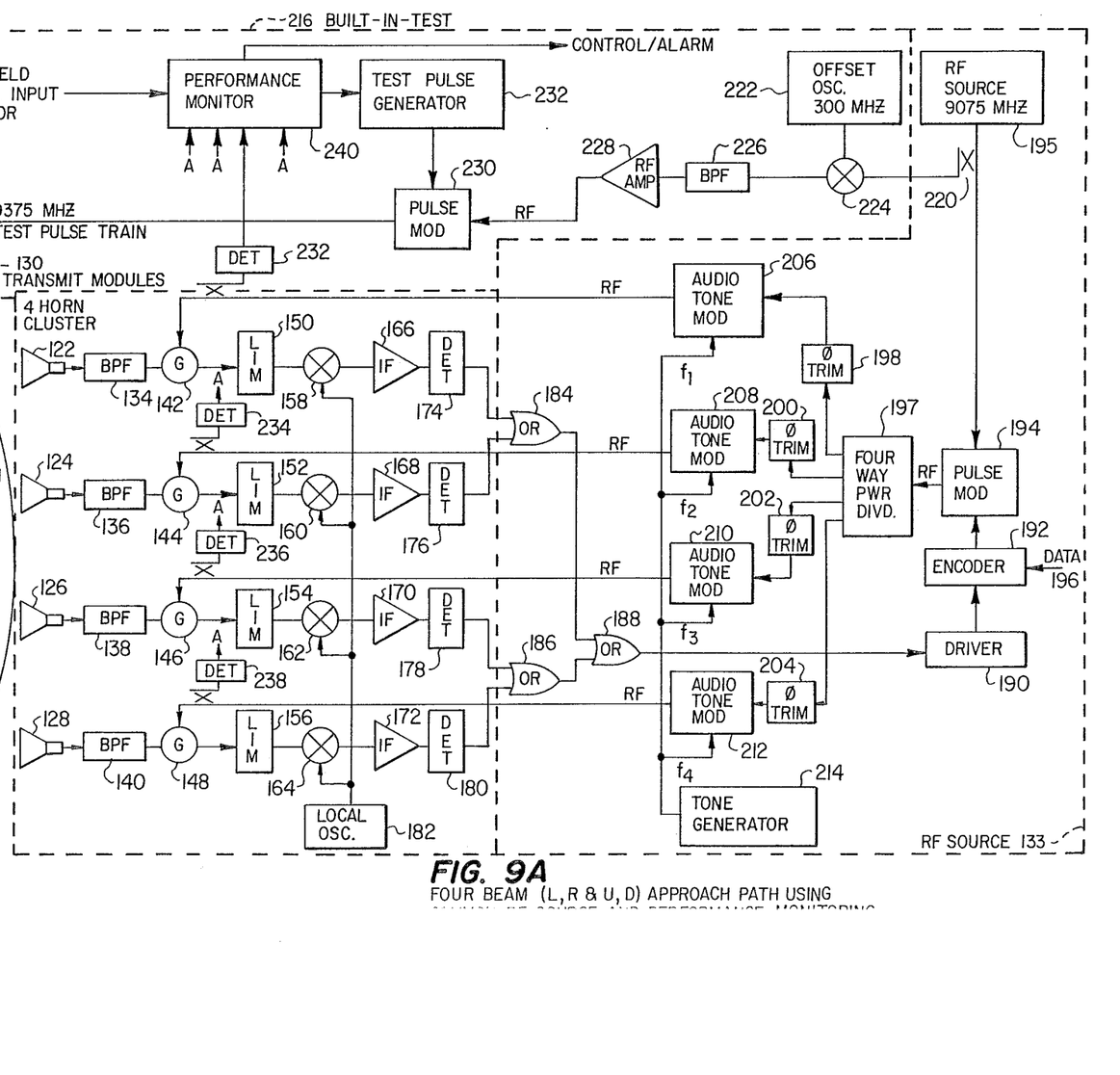
FIG. 9a shows another implementation using one focusing means, a four beam approach with manifold fed modules and common RF source with a built-in-test capability.
Figure 9B:
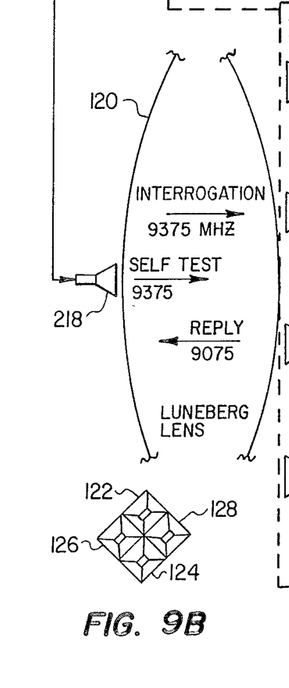

A fifth embodiment is shown in FIGS. 9a and 9b. In this embodiment a single lens 120 focuses incoming energy into four horns 122, 124, 126 and 128. The horns are arranged in a cluster as shown in FIG. 9b, i.e., there are two horns in the vertical and two horns in the horizontal. This four horn cluster in conjunction with the focusing means generates a pattern of four relatively high gain pencil beams (high-low, left-right) whose patterns crossover at their half power points. This crossover point defines the aircraft's approach path when properly oriented to the landing site. As before, the position of the aircraft relative to the defined approach path is determined by amplitude comparison of the audio tone modulation which identifies each beam.

The four receive/transmit modules 130 and their horn feeds (FIG. 9a) are similar to the module described in FIG. 7. An important distinction is that all four units of the receive and transmit modules 130 use a common RF source 133 to minimize output amplitude fluctuation amongst the four units and the corresponding variation in relative power density between beams, which is a potential source of approach path position error.

The components of the receive/transmit modules 130 include besides the horns or waveguide feeds 122, 124, 126 and 128, bandpass filters 134, 136, 138 and 140 connected to the horns, respectively, receive and transmit circulators 142, 144, 146 and 148 connected to the BPFs, respectively, and to superterodyne circuits including limiters 150, 152, 154 and 156 connected through the circulars to the BPFs, respectively, mixers 158, 160, 162 and 164 connected, respectively, to the limiters and to a common local oscillator 182 for producing IF signals of the incoming RF energy, IF amplifiers 166, 168, 170 and 172 connected to the mixers, respectively, for amplifying the IF signals, and detectors 174, 176, 178 and 180, connected respectively, to the IF amplifiers for detecting the envelope of the video pulse train.

The interrogating signal from an aircraft transmitter located within the locus of the four beams may be intercepted by the horns or predominantly by a single horn. The outputs of the detectors 174, 176, 178 and 180 are ORed in OR gates 184 and 186 connected to the detectors with the output thereof exiting a final OR gate 188; a high output triggers an RF reply pulse from the RF source 133.

The aircraft interrogating signal pulse train exits a final OR gate 188. A driver 190 connected to the OR gate 188. The driver is triggered by the pulse train of the OR gate to produce a pulse train through an encoder 192 to a pulse modulator 194. The encoder 192 is connected to the driver 190 and to a data source 196, and inhibits selected pulses to encode on the pulse train the data from the data source. The encoder's output is thus a video pulse train corresponding to the interrogator signals, but modified to contain the intelligence of the external data source.

The pulse modulator 194 is connected to the encoder 192 and to an RF source (9075 MHz) 195 and converts the video pulse train to an RF pulse train. A four way power divider 197 is connected to the pulse modulator for dividing the RF pulse trains power equally through phase trimmers 198, 200, 202 and 204 connected to the divider, to audio tone modulators 206, 208, 210 and 212. An audio tone generator 214 producing frequencies $f_1$, $f_2$, $f_3$, and $f_4$ is connected in common to the audio tone modulators. The tone modulators impose the individual tone modulations on the RF pulse train which identifies each of the four beams and defines the approach path to the aircraft's interrogator guidance receiver. Port (c) of the circulators 142, 144, 146 and 148 is connected to the tone modulators for passing the modulated RF pulse train through the horns 134, 136, 138 and 140, respectively, and lens 120 to the aircraft's radar receiver. It is important to the achievement of proper antenna performance that the four horns be fed in phase. To assure this the electrical line lengths from the horns phase centers back to the input of the four way power divider are equal. If this is possible the phase trimmers 198, 200, 202 and 204 are not necessary. In this fashion, the ground transponder information is transmitted to the aircraft's guidance receiver for processing the beam's modulation tones into up-down, left-right guidance signals to accurately guide the aircraft along the approach path.

To assure proper system operation a built-in-test circuit 216 is provided. The test circuit includes a single horn 218 for illuminating the receive/transmit horns 122, 124, 126 and 128 from the opposite (forward) side of the Luneberg lens 120. The test signal is a continuous pulse train at the interrogating frequency (9375 MHz) obtained by a directional coupler 220 operatively connected to the RF (9075 MHz) source 195, mixing the sample with a 300 MHz offset frequency from LO 222 in a mixer 224. A BPF 226 connected to the mixer eliminates the unwanted mixer outputs, and an amplifier 228 connected to the BPF amplifies the remaining carrier (9375 MHz).

A pulse modulator 230 is connected to the amplifier 228 and to a test pulse generator 232 to produce the train of RF test pulses for the horn 218. Horns 122, 124, 126, and 128 intercept a portion of the test train energy which is amplified and processed in the same way as an aircraft interrogation signal. The RF reply pulse train generated in response to the test signal is sampled by four directional couplers and detectors 232, 234, 236 and 238. A performance monitor 240 is connected to the detectors. Any discrepancies will trigger a control/alarm.

In a full landing system the four beam precision approach of FIG. 9 is supplemental by the modules of FIG. 8 to provide an expanded approach window to the landing path.

It will be appreciated by those skilled in the art that the ground based transponder can be implemented using any of the above described embodiments as follows.

Figure 10A:
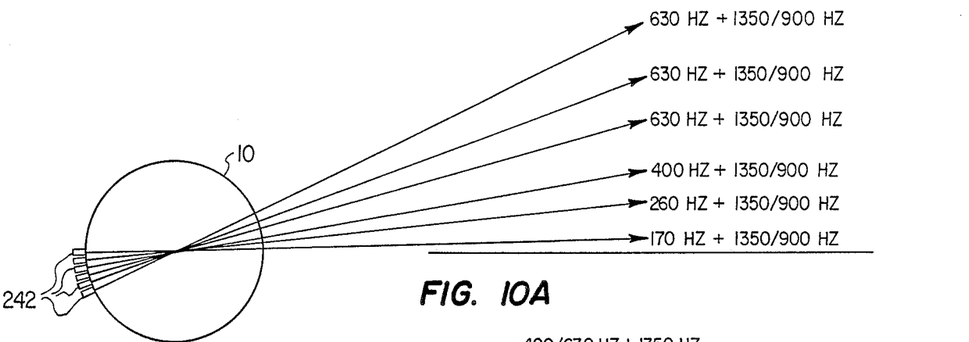
FIGS. 10a and 10b are side and top views of an embodiment of a transponder using an array of transponder modules arranged in close proximity to the surface of a RF Luneberg to generate a matrix of high gain pencil beams.
Figure 10B:
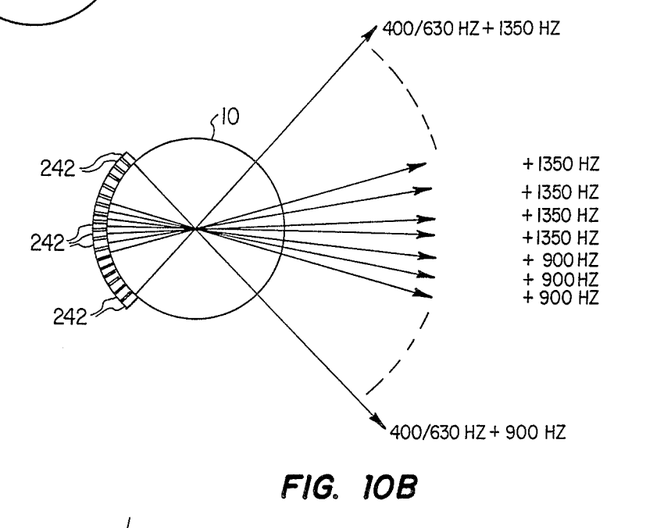

Referring to FIG. 10a, a side view of a stationary Luneberg lens type focusing means is shown with several transponding modules 20 arranged in a vertical column 242. The number of modules is determined by the size of the lens, the RF operating frequency, and the total coverage desired in elevation angle. A column that is six modules high has been chosen arbitrarily as an example. The side view of FIG. 10a shows only one column, but a matrix pattern is actually used, with a few or many columns mounted side by side around the lens. A top view, of the lens (FIG. 10b) and module matrix are shown with several columns 242 mounted side by side. Additional columns could be used to cover the complete circumference of the lens to provide guidance throughout 360° in azimuth if desired for great flexibility in choosing an azimuth heading, for example, for use with helicopters that do not have a runway they have to line up with.

In FIG. 10a five of the six transponders 242 provide four glide path approach angles which may be selected in the cockpit of a helicopter. The three glide slope paths are defined by the points of equal modulation power between the beams (e.g. 170 and 260; 260 and 400; 400 and 630). The two additional 630 Hz beams provide additional high angle coverage. If the elevation beamwidth is 3.0 degrees, then the cockpit may select a 3, 6, or 9, degree glide slope angle.

It will be noted that in FIG. 10a a signal of 1350/900 Hz is also present in the modulation of the column 242. Such mixing of different audio frequencies is a common technique, and the frequencies can be readily separated electronically. The purpose of the 1350/900 Hz modulation frequencies is to provide azimuth information on the same lens by having different columns modulated at a set of frequencies different than the glide slope modules. The two frequencies illustrate the tone modulation on selected and adjacent beams in azimuth which define an azimuth (localizer) approach path. This is particularly useful in helicopter or V/TOL aircraft usage where the glide path transponder should be essentially co-located with the localizer (or azimuth) transponder. For fixed wing aircraft, it is very likely that two separate transponder units would be used; the glide slope transponder located near the desired touchdown point, and modulated only with glide slope frequencies, while a second localizer transponder lens assembly would be on the extended centerline of the far end of the runway to provide roll-out guidance during landing, and would be modulated by only azimuth audio frequencies.

An as example of the operation of the transponder, the glide slope frequencies plus the azimuth frequencies are shown in FIG. 10a. The 1350/900 Hz has been arbitrarily chosen as the azimuth center line frequency. In the top view FIG. 10b, the azimuth frequencies are shown along with two representative glide slope frequencies. In this view, a cone is cut encompassing the 400/630 Hz glide slope signal; i.e. as an aircraft deviates in azimuth, it still receives a 400 and/or 630 Hz glide slope signal if it is on the same glide slope angle. More than one azimuth approach path can be incorporated by proper placement of additional modulation tones. Thus, a helicopter can select any of three glide slopes and several azimuth approach courses. Also, data from the ground unit may be transmitted through the pulse coded data train previously discussed. This may be used to indicate to the pilot the recommended approach path. Thus, he can choose the best azimuth approach path as well as choose his glide slope.

Figure 11A:
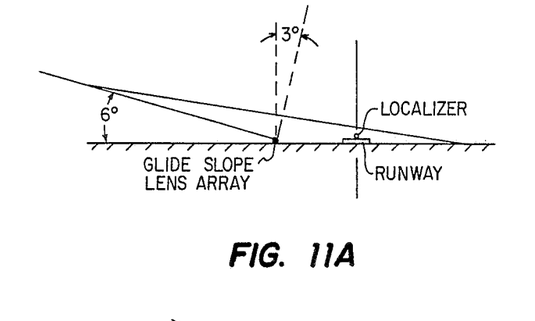
FIGS. 11a–11c are views of a hyperbolic glide slope produced by this invention.
Figure 11B:
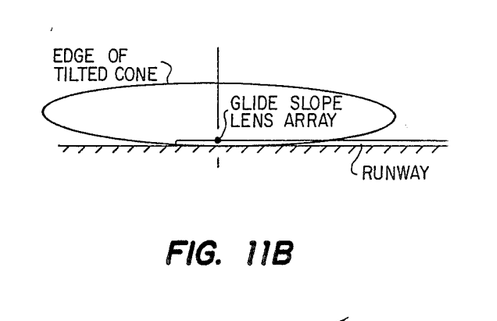
Figure 11C:
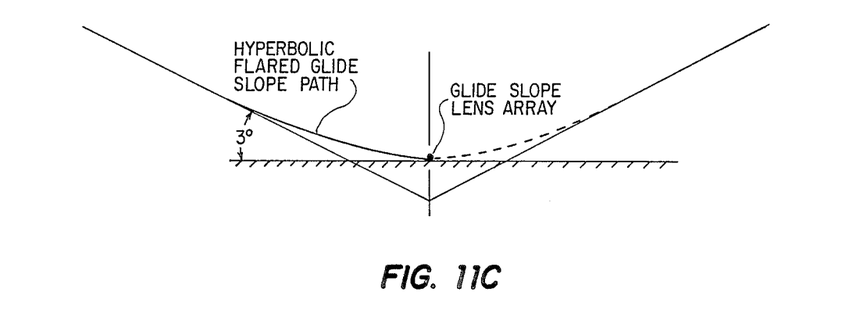

As previously mentioned for fixed wing aircraft, two ground Luneberg lens transponder equipments are required. The glide slope transponder located offset from the runway at touchdown and the localizer transponder on an extended centerline at the far end of the runway. If, for example, the desired glide slope for fixed wing aircraft is 3.0 degrees the vertical axis of the glide slope Luneberg lens may be rotated 3.0 degrees in the direction of and orthogonally to the runway centerline. This is illustrated in FIG. 11a. FIG. 11b is a side view of the cone edge which is an ellipse. As an aircraft nears threshold the 3.0 degree glide slope is now hyperbolic and automatically flares the aircraft over threshold and on to touchdown. This is illustrated in FIG. 11c.

Figure 12:
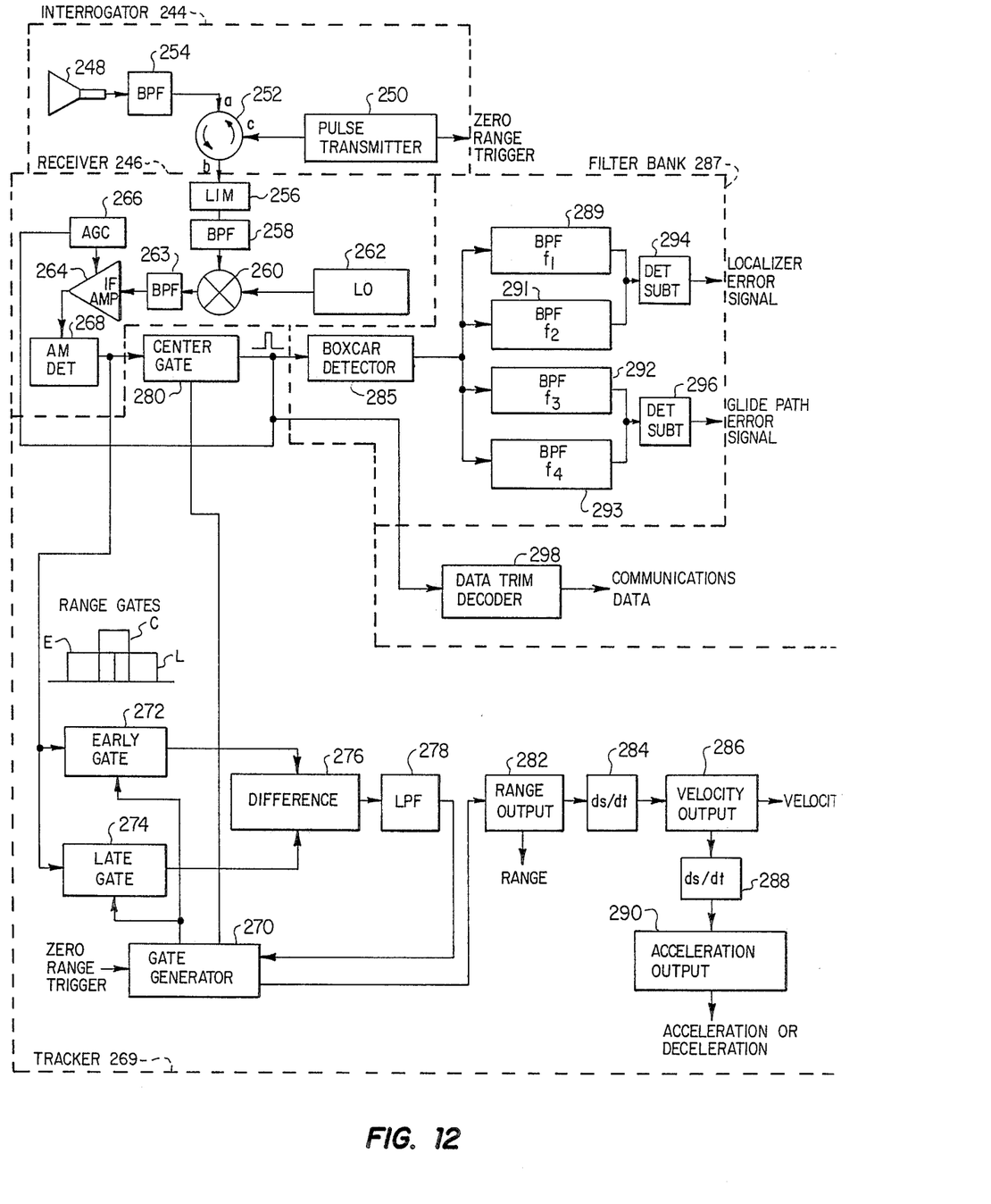
FIG. 12 is an embodiment of a pulsed interrogator and receiver used for example, in a vehicle (aircraft), with the ground transponders hereinafter described.

Having completed the description of the ground based transponder, the radar receiver/transmitter (interrogator) will be described with reference to FIG. 12. The vehicle borne interrogator-receiver is shown. This unit is basically a range-only interrogator-receiver with a pulse transmitter (interrogator) 244 and a receiver 246. The interrogator includes a fixed, non-scanning reflector, flat plate, or horn antenna 248 which both transmits and receives. The interrogate transmit pulse is generated in a pulse transmitter 250 and is fed into port (c) of a conventional RF circulator 252, which directs it out of port (a), through a bandpass filter 254 and out the antenna 248. This interrogator pulse triggers one or more of the transponder modules, which then transmits a pulse in a very narrow microwave beam back to the antenna 248, now used as a receive antenna.

The receive pulse passes through the bandpass filter 254 and into port (a) of the circulator 252, which directs the receive pulse out of port (b) and into signal level limiter 256 of the receiver 246. From here it passes through a bandpass filter 258 and is fed to an RF mixer 260 where it is beat with an RF signal from local oscillator 262 to produce an intermediate frequency (IF) signal, which is filtered in bandpass filter 263, before being applied to an IF amplifier 264 with automatic gain control (AGC) 266. The pulse signal is amplitude detected in detector 268 to produce a video signal, which is fed in two directions. Basically, one path is through a tracker 269 which includes circuitry used to determine radar range from the vehicle to the ground unit, as well as closure rate and acceleration or deceleration toward the ground unit and the second path is through a filter-bank 284 which includes circuitry for determining azimuth and glide slope errors.

First the path determining range, range rate and acceleration will be described. An acquisition and gate generator 270 is triggered at the time the transmitter is pulsed. It generates an early gate 272 and a late gate 274, the latter starting when the former stops. The pulse signal from the video detector is fed into both gates. As the pulse travels through these gates, the relative amount of signal that arrives early or late is determined, and by subtracting signal (energy) levels in a difference (subtract) circuit 276, a signal is derived and filtered by filter 278 and used to force the gate generator 270 to move the time position of both gates until equal energy arrives early and arrives late, and thus the centroid of the pulse is centered between the two gates. The gate generator also generates a center gate, centered in time within the early and late gates, which is substantially of the same time duration as the transponder pulse width, and by opening the center gate 280, allows the video pulse to pass through the proper circuits with very little competing noise with the gate.

The fact that the gate generator is driven in time to center the early and late gates over the video pulse provides a measure of time from the zero range (transmit) pulse, and hence an accurate measure of range from the vessel or aircraft to the transponder. This elapsed time is fed to range output circuit 282, where it is converted to a format desired for display or other use. The range output is then differentiated by circuit 284 to produce a velocity, or range rate, signal. This is converted in circuit 286 into an output suitable for display or other use, and is also fed to a differentiator circuit 288 where acceleration information is generated. This is converted in circuit 290 into a format for display or other use.

Returning now to the other basic path the signal from video detector 268 takes, the pulse train is fed through the center gate 280 that has been opened to let it pass into a boxcar detector 285, where the composite audio frequency signals are fed to a filter bank 287 consisting of parallel bandpass filters 289, 291 292, and 293 tuned to specific audio frequencies represented as $f_1$, $f_2$, $f_3$ and $f_4$. Instead of four filters, as many filters can be used as required to separate the information transmitted by the ground unit transponder, but four are shown for simplicity and serve to describe the function. After the audio composite signal has been broken down into its desired components, audio signals representing right and left information, $f_1$, and $f_2$, are fed to a detector subtractor 294, where the difference in amplitudes is determined, and this data is outputted as localizer error for display or other use. Likewise, $f_3$ and $f_4$ are fed through detector subtractor 296 to produce a glide path error signal.

The pulse train out of the center gate is also fed to a data train decoder 298 where the communications data, such as meteorological data from the ground unit, is processed for further use.

Although several embodiments of the invention have been described in detail, it will be appreciated by those persons skilled in the art that various modifications and changes thereto can be made without departing from the scope of the invention.

What is claimed is:

1. An improved instrument landing and takeoff system comprising:
   a. an airborne RF energy transmitter/receiver for transmitting RF interrogator signals along a path and receiving returns containing landing information back along the same path;
   b. a stationary transponder including a stationary RF energy focusing means for focusing the RF interrogator signals, an array of active receive module means arranged in rows and columns each active receive module means of the array including means responsive to impinging focused RF energy signals for modulating signals with information pertinent to landing operations and returning the modulated RF interrogator signals through the focusing means for retransmission along the path from which they cam to the receiver of the airborne transmitter/receiver; and
   c. wherein each of the receive module means of the array of active receive modules includes a receive module having an energy receptor for receiving the focused RF energy interrogator signals, and an amplifier responsive to the RF energy interrogator signals for amplifying said RF signals, and said means for modulating said RF signals includes a transmit module having an audio generator and data encoder, an audio frequency modulator responsive to the amplified RF signals, and audio frequency generator and data encoder output for producing an audio frequency amplitude modulated pulse train with identifying tone frequency according to locations and function in the array which corresponds to the beam position the module generates in space, and an energy feed means for transmission of the audio frequency amplitude modulated pulse train into the focusing means for retransmission back along the same path to the receiver of the transmitter/ receiver means.

2. An improved landing and takeoff system according to claim 1, wherein the receiver of the airborne transmitter/receiver is tuned to a frequency different from the transmit frequency and the receive module further includes a mixing means responsive to the incoming focused RF energy for producing an IF signal and said transmitting means further includes an oscillator amplifier means for producing an RF signal whose frequency is discretely offset from the receive frequency to the receiver's frequency for the pulse modulator whereby the airborne receiver receives the returning RF energy without being influenced by any ground clutter returning at the transmit frequency.

3. An airport landing system comprising:
   a. an airborne microwave transmitter and receiver for transmitting RF energy pulses at a first frequency and receiving responding RF energy pulses at a second frequency for clutter discrimination;
   b. a stationary RF energy focusing means responsive to the transmitted RF energy pulses for focusing the transmitted energy;
   c. at least four receive/transmit modules and at least one RF source module said at least one RF source module responsive to the received RF energy for modulating and amplifying the RF energy for transmitters of the receive/ transmit modules said receive/transmit modules being arranged physically for transmitting at least four relatively high gain powered beams simultaneously whose patterns crossover at their half power points, said crossover point defining the approach path, and
   d. wherein said at least four receive/transmit modules include at least four RF energy horns arranged in a cluster of two vertically disposed horns and two horizontally disposed horns for producing simultaneously the pattern of four relatively high gain powered beams whose patterns crossover at their equal power points.

4. An airport landing system according to claim 3 wherein said at least four receive/transmit modules include at least four RF energy horns arranged in a cluster of two vertically disposed horns and two horizontally disposed horns for producing simultaneously the pattern of four relatively high gain powered beams whose patterns crossover at their half power points.

5. An airport landing system comprising:
   a. an airborne microwave transmitter and receiver for transmitting RF energy pulses at a first frequency and receiving responding Rf energy pulses at a second frequency for clutter discrimination;

b. a stationary RF energy focusing means responsive to the transmitted RF energy pulses for focusing the transmitted energy;

c. at least four receive/transmit modules and at least one RF source module said at least one RF source module responsive to the receive RF energy for modulating and amplifying the RF energy for transmitters of the receive/ transmit modules said receive/transmit modules being arranged physically for transmitting at least four relatively high gain powered beams simultaneously whose patterns crossover at their half power points, said crossover point defining the approach path, and d. further including a built-in test circuit operative in response to field signals and sampled RF return signals for determining any discrepancies therebetween.

6. An aircraft landing system according to claim 5 further including a logic means responsive to the output of the superheterodyne means for determining the presence of incoming RF energy in pairs of the superheterodyne circuits and passing selectively an RF pulse train when a high appears as an output from either of the pairs of superheterodyne circuits.

7. An aircraft landing system according to claim 6 wherein the logic means is an exclusive OR gate arrangement.

8. An aircraft landing system according to claim 7 wherein each superheterodyne circuit includes a mixer and a local oscillator, said mixer responsive to the incoming RF energy pulse and local oscillator for producing intermediate frequency signals of the incoming RF signals, and detectors responsive to the IF signals for detecting the envelope of the video pulse train.

9. An aircraft landing system according to claim 8 wherein the collector means of the four transmit/receive modules are positioned with two collector means for receiving, selectively, incoming RF energy above and below the glide slope path and two collectors for receiving, selectively, incoming energy right and left of the azimuth path to the landing path and wherein exclusive OR gates are connected, respectively, to receive any video pulse trains from the above/below glide slope receive/transmit modules and the left/right of azimuth receive transmit modules and providing high signals, respectively, when either an above or below glide slope and either a left or right of azimuth video pulse train is present, and an OR gate operatively connected to the exclusive OR gates for outputting a pulse train when either an above or below glide slope pulse train or a left or right of azimuth pulse train or both is present.

10. An aircraft landing system according to claim 9 wherein the RF source circuit includes a data source means and an encoder means responsive to any pulse train output of the OR gate and data source for inhibiting selected pulses to encode on the video pulse train the data of the data source, a pulse modulator responsive to the coded video pulse train for producing an RF pulse train thereof, an at least four way divider responsive to the coded RF pulse train for dividing the RF pulse trains power equally, an audio tone generator for producing at least four separate audio tone frequencies, at least four audio tone modulators responsive to the equally divided RF pulse train power for imposing the individual tone modulators on the RF pulse train for identifying,the beam portion and defining the approach path to the aircraft's radar receiver.

11. An aircraft landing system according to claim 10 wherein the at least four circulators pass the tone modulated RF signals in phase to the RF energy collectors means.

12. An aircraft landing system according to claim 10 further including at least four phase trimmers responsive to the equally divided RF pulse train power outputs for correcting any phase errors resulting from any difference in lengths from the input of the four way power divider to the phase centers of the RF energy collecting means.

13. An improved instrument landing and takeoff system comprising:
a. an airborne RF energy transmitter/receiver for transmitting RF energy interrogator signals of a first frequency along a path and receiving returns back along the same path at a second frequency; and b. a stationary transponder comprising an RF energy focusing means for focusing received RF interrogator signals, a receive/transmit audio frequency module including an RF energy collecting means for receiving the focused RF energy, an RF circulator operatively connected to the RF energy means for passing the RF energy, an intermediate frequency (IF) producing means responsive to RF energy having first and second frequencies for producing IF signals, a data encoder means responsive to the IF signals for producing a pulse coded data train code that is time shared with an output signal containing information, a pulse modulating means operatively connected to the data encoder means for imposing an audio frequency envelope on the pulse train containing precision glide slope guidance information and converting the frequency of the pulse train to the second frequency, said circulator means operatively connected to the pulse modulating means for directing substantially all of the modulated RF energy back through the RF energy collection means, and focusing means for focusing the modulated RF energy into a tight beam for transmission back along the same path to the receiver of the airborne RF energy transmitter/receiver.

14. An airport landing and takeoff system according to claim 13 wherein the airborne transmitted RF signal is in the microwave spectrum and the IF frequency producing means includes a mixer and a local oscillator, the local oscillator for producing an LO signal in the megahertz spectrum, said mixer responsive to the incoming RF microwave spectrum signal and megahertz spectrum LO signal for producing a sum and difference signal in the microwave spectrum, for modulation into the amplitude modulated pulse train for transmission to the receiver of the airborne transmitter/receiver.

15. In an airport landing system utilizing an airborne transmitter and receiver, a stationary transponder comprising:
a. a stationary RF energy focusing means for focusing received RF energy signals; and b. a plurality of receive/transmit modules and at lease one RF energy source module operatively connected to the plurality of receive/transmit modules for supplying RF energy thereto, said plurality of receive/transmit modules including a plurality of RF energy collecting means arranged for receiving RF energy signals and transmitting a plurality of RF energy beams whose transmission patterns crossover at their half power points, said crossover point defining an approach path.

16. An airport landing system comprising:
  a. an airborne microwave transmitter and receiver for transmitting RF energy pulses at a first frequency and receiving responding RF energy pulses at a second frequency for clutter discrimination;
  b. a stationary RF energy focusing means responsive to the transmitted RF energy pulses for focusing the transmitted energy;
  c. at least four receive/transmit modules and at least one RF source module said at least one RF source module responsive to the received RF energy for modulating and amplifying the RF energy for transmitters of the receive/ transmit modules said receive/transmit modules being arranged physically for transmitting at least four relatively high gain powered beams simultaneously whose patterns crossover at their half power points, said crossover point defining the approach path, and
  d. wherein the at least four receive/transmit modules each include an RF energy collection means for gathering the impinging focused RF energy pulses, a superheterodyne means responsive to the RF focused energy for detecting the envelope thereof and producing a video pulse, means for determining the presence of a video signal from at least one of the superheterodyne means and outputting a video pulse train, an RF source means responsive to the video pulse train for producing an RF reply pulse, and a circulator means responsive to the received RF energy pulses for feeding the received pulses to the superheterodyning means and to the RF reply pulses for feeding the RF pulses both through the focusing means and lens for transmission to the radar receiver.

17. An airport landing system comprising:
  a. an airborne microwave transmitter and receiver for transmitting Rf energy pulses at a first frequency and receiving responding RF energy pulses at a second frequency for clutter discrimination;
  b. a stationary RF energy focusing means responsive to the transmitted RF energy pulses for focusing the transmitted energy;
  c. at least four receive/transmit modules and at least one RF source module said at least one RF source module responsive to the received RF energy for modulating and amplifying the RF energy for transmitters of the receive/ transmit modules said receive/transmit modules being arranged physically for tranmsitting at least four relatively high gain powered beams simultaneously whose patterns crossover at their half power points, said crossover point defining the approach path, and
  d. wherein said system includes additional sets of the at least four receive/transmit modules and RF source module for providing a corresponding number of approach paths.

18. An improved instrument landing and takeoff system comprising:
  a. an airborne RF energy transmitter/receiver for transmitting RF interrogator signals along a path and receiving returns containing landing information back along the same path;
  b. a stationary transponder including a stationary Rf energy focusing means for focusing the RF interrogator signals, an array of active receive module means arranged in rows and columns each active receive module means of the array including means responsive to impinging focused RF energy signals for modulating signals with information pertinent to landing operations and returning the modulated RF interrogator signals through the focusing means for retransmission along the path from which they came to the receive of the airborne transmitter/receiver; and
  c. wherein the airborne RF energy transmitter/receiver further includes means for producing wide band random pulse repetition rate (PRF) jitter for preventing interference between aircraft.

* * * * *